United States Patent [19]

Watson et al.

[11] 4,147,464
[45] Apr. 3, 1979

[54] HOLE CUTTER FOR HARD MATERIALS SUCH AS CERAMIC TILE

[75] Inventors: Wayne C. Watson, Ambler; Jonas W. Weisel, Line Lexington, both of Pa.

[73] Assignee: American Olean Tile Company, Inc., Lansdale, Pa.

[21] Appl. No.: 887,139

[22] Filed: Mar. 16, 1978

[51] Int. Cl.² ........................ B23B 41/02; B23B 51/00
[52] U.S. Cl. .................................. 408/206; 408/226; 408/231; 408/703
[58] Field of Search ............... 408/200, 201, 204, 206, 408/208, 209, 214, 216, 223, 224, 225, 231, 226, 703; 407/42, 116

[56] References Cited

U.S. PATENT DOCUMENTS

| | | | |
|---|---|---|---|
| 2,468,562 | 4/1949 | Lank | 407/42 |
| 2,853,904 | 9/1958 | Mackey | 408/206 |
| 3,184,827 | 5/1965 | Melvin | 407/116 |
| 4,072,437 | 2/1978 | Smith et al. | 408/703 |

Primary Examiner—Harrison L. Hinson
Attorney, Agent, or Firm—Henry K. Leonard

[57] ABSTRACT

A hole cutter for hard material such as ceramic tile. The cutter has a cylindrical body which has an axial opening and a pilot drill is mounted therein. The drill and the opening are non-circular, for example, hexagonal, in order to prevent relative rotation between the drill and the body. The body has a plurality of axially extending recesses in its periphery and an axially extending cutting blade which has an arcuate cross-section is positioned in each recess. The drill and the blades have carbide tips. The tips on the blades have beveled outer corners which prevent them from radially spreading when drilling and which minimize chipping the tile or its glaze. Mounting holes through the blades and in the recesses are spaced circumferentially away from their center lines to prevent improper mounting.

6 Claims, 3 Drawing Figures

HOLE CUTTER FOR HARD MATERIALS SUCH AS CERAMIC TILE

BACKGROUND OF THE INVENTION

While many different types of rotary hole saws or hole cutters have been suggested in the past, none of them has been entirely satisfactory for cutting holes in ceramic tile, particularly in ceramic tiles which have hard glazed surfaces, such as those used for bath tub enclosures and the like. So-called diamond core drills and carbide grit hole saws have been recommended for use on ceramic tile.

While a diamond core drill will, of course, cut through a ceramic tile, experience has shown that a water spray must be employed to cool the drill while it is cutting or the diamonds will be lost. Not only does this necessitate auxiliary equipment to supply the cooling water, but the tiles become saturated with water which tends to make them incompatible with adhesives used to hold the tile in place.

Hole saws with carbide grit bonded to their teeth also will cut through ceramic tile. However, actual tests have shown that such a saw will only cut a few holes before much of the carbide grit is lost and, of course, the grit cannot be replaced nor can the saw be re-sharpened.

It is therefore the principal object of the instant invention to provide a hole cutter for hard materials, such as ceramic tile, which is so designed as to minimize the chipping of the hard material and particularly the glazed surfaces of ceramic tile when a hole is being cut.

A further object is to provide a hole cutter having cutting blades which have carbide tips thereby providing a long life and which readily can be removed and replaced when necessary.

Another object of the instant invention is to provide a rotary hole cutter for ceramic tile which is so designed as to minimize "chattering" and the resulting irregularities in the hole edges.

It is yet another object of the instant invention to provide a hole cutter for ceramic tile wherein relative rotation between the pivot drill and the cutter body is eliminated and where the tendency of the cutters mounted on the body to flare outwardly is minimized.

DESCRIPTION OF PREFERRED EMBODIMENT

Figure 2:
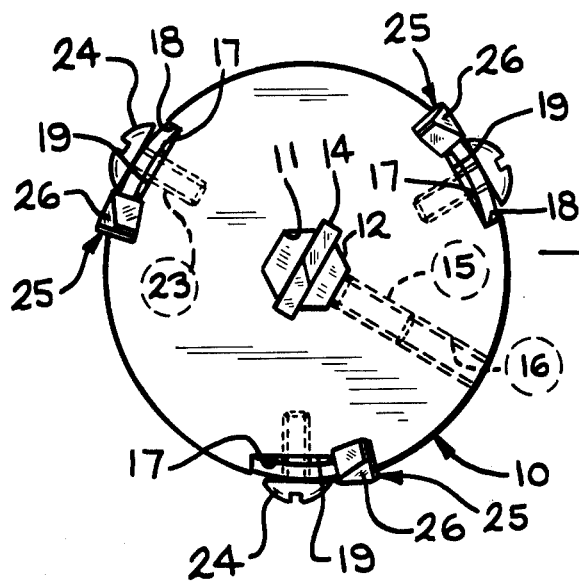
FIG. 2 is a top plan view of the cutter shown in FIG. 1.
Figure 3:
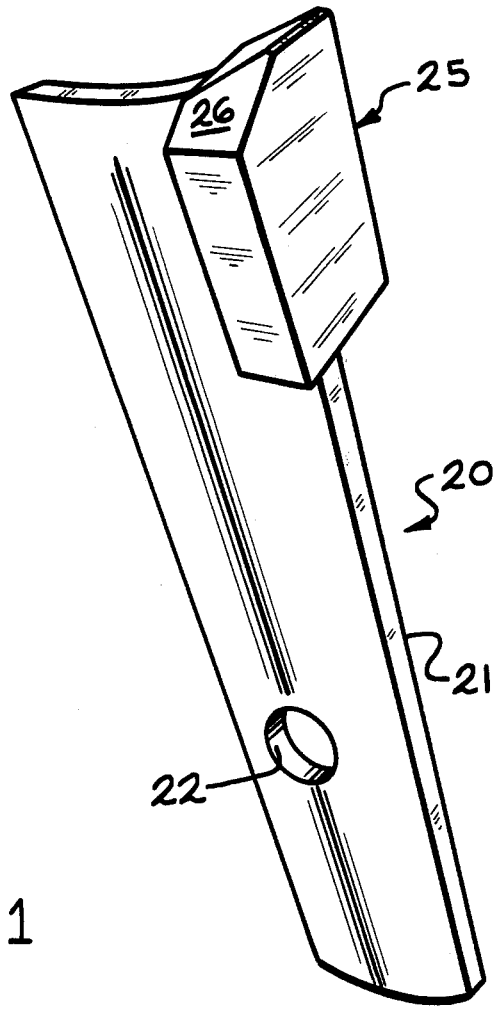
FIG. 3 is a greatly enlarged view in perspective of one of the cutter blades with which a hole cutter embodying the invention is equipped.

A hole cutter embodying the invention has a cylindrical body 10 in which there is formed, preferably by broaching, an axial opening 11 of non-circular cross-section, in this case hexagonal, although, of course, the hole may be of some cross-section other than hexagonal so long as it is non-circular. A pilot drill 12 has a shaft 13 of cross-section that is complementary to the hole 11, in this case, also being of hexagonal cross-section. The pilot drill 12 has a carbide tip 14 which, in usual fashion, is set into a transverse slot and secured by appropriate silver soldering. The pilot drill 12 is held in place, i.e., protruding a desired distance beyond the body 10, by a set screw 15 which is threaded into a radial tapped hole 16 in the body 10.

A cutting blade 20 is positioned in each of the recesses 17. Each of the cutting blades 20 has an elongated shank 21 which is arcuate in cross-section as best can be seen in FIG. 2. The shank 21 is of such circumferential width as to nest snugly in one of the recesses 17 and of such axial length as to protrude forwardly from the body 10 a distance greater than the thickness of the material through which the hole is to be cut.

Figure 1:
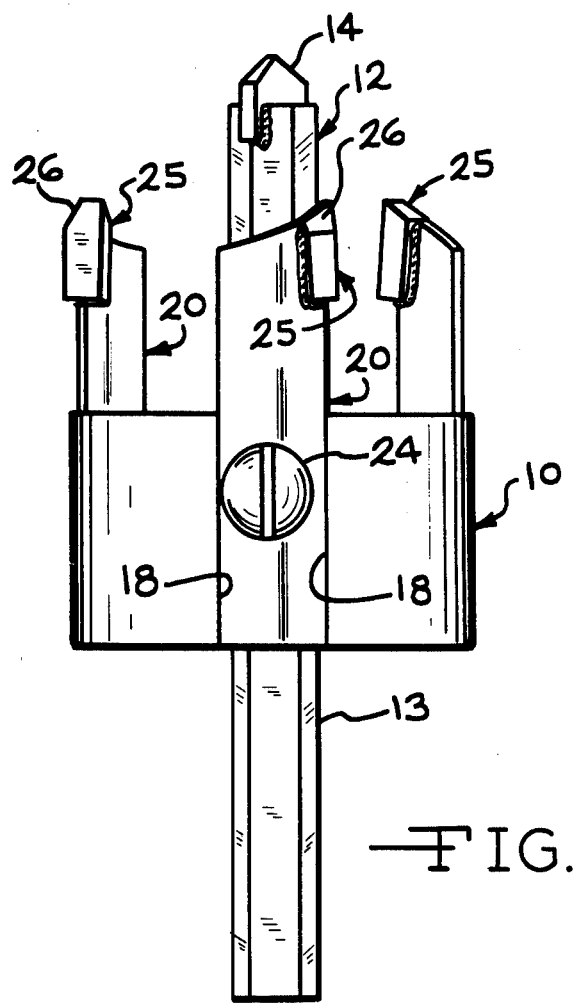
FIG. 1 is a view in side elevation of a hole cutter embodying the invention, the cutter being shown on a scale larger than that which normally is utilized for the purpose intended.

Each of the cutting blade shanks 21 has a hole 22 which is circumferentially offset from the median line of the shank 21 as best can be seen in FIG. 1. A tapped hole 23 in the body 10 opening into the respective recess 17 similarly is offset circumferentially from the medial line of the recess so as to align with the hole 22 in the cutting blade shank 21 when the cutting blade 20 is in position in the respective recess. Each of the cutting blades 20 is retained in one of the recesses 17 by a machine screw 21 and, when the screw 21 is tightened in place, it slightly flexes the arcuate shank 21 and the resiliency of the shank 21 thrusting outwardly against the head of the screw 24 binds the screw 24 so that it is less likely to become loosened. By thus circumferentially offsetting the holes 22 and the tapped holes 23 from the median lines of the cutting blade shanks 21 and the recesses 17, improper or reverse mounting of the cutting blades 21 in the recesses 17 is prevented.

Each of the cutting blades 20 has a carbide tip 25 which is soldered in a recess (unnumbered) cut in the leading end of the respective shank 21. As can best be seen in FIG. 1, both the end of the cutting blade shank 21 and the tip 25 are cut backwardly and downwardly relative to the direction of rotation to provide a raked end on each of the cutting blades 20.

In addition, and importantly according to the invention, the radially outward side of each of the tips 25 is beveled as indicated by the reference number 26 so that as the cutting blades move into the work piece, i.e., into the surface of the ceramic tile in which the hole is being bored, radially outward flexing of the cutting blades 20 is prevented. Because the shanks 21 are arcuate and are under some compression by reason of the tightening of the screws 24, the shape of the shanks 21 also works against outward flexing of the cutting tips 25 as they progress into the work. As the cutting edges of the tips 25 cut into the surface of the work piece, the beveled shoulders 26 begin to bear against the surface and gradually and progressively cut a beveled edge away from the hole being bored progressively counter boring the tile body with the outside diameter of the hole being bored predetermined by the radially outward side of the leading edge of the beveled shoulders 26.

Because most ceramic tile through which holes would be bored does not have a thickness greater than ¼ inch or, even in the case of heavy floor tiles, of ¾ inch, the pilot drill 12 protrudes through the tile prior to the boring of the hole and the cutting blade tips 25 protrude far enough forwardly of the body 10 so that the hole is completely bored through the ceramic tile prior to the time that the surface of the tile would be engaged by the machine screws 24.

Having described our invention, we claim:

1. A hole cutter for hard materials, such as ceramic tile, said cutter comprising, in combination, (a) a generally cylindrical body having an axial opening therethrough and a plurality of axially extending recesses in its periphery, each of such recesses having parallel axially extending side walls, (b) a pilot drill shaft mounted non-rotatably in and extending axially through the axial opening in said body, (c) a plurality of cutting blades, each of said blades having an axially extending shank of arcuate cross-section that is adapted to fit into one of the recesses in said body, (d) a cutting tip on each of said shanks, said tip having a rearwardly raked end and a beveled, radially outward side, (e) means for releasably securing said body on said pilot drill shaft, and (f) means for removably securing said cutting blades in the recesses in said body.

2. A hole cutter according to claim 1 in which all of the cutting blades are identical and each of said blades has a mounting hole through its shank which is circumferentially offset from the axial center line of said shank and in which there is a radial hole in the base of each recess that is aligned with the mounting hole in said shank when said blade is in one of the recesses and the means for securing each of said blades in one of the recesses extends through the aligned holes, whereby improper mounting of a cutting blade on the body is prevented.

3. A hole cutter according to claim 1 in which the depth of the recesses in said body is at least equal to the radial thickness of the cutting blade shanks.

4. A hole cutter according to claim 1 in which the axially extending recesses in the periphery of the body have radially inner sides that lie in planes that are normal to a radius of said body.

5. A hole cutter for hard materials such as ceramic tile, said cutter comprising, in combination, (a) a generally cylindrical body having an axial opening therethrough, (b) a pilot drill shaft mounted non-rotatably in and extending axially through the axial opening in said body, (c) a plurality of cutting blades, each of said blades having an axially extending shank of arcuate cross-section that is approximately concentric with the periphery of said body, (d) a cutting tip on each of said shanks, said tip having a rearwardly raked end and a beveled radially outward side, (e) means for releasably securing said body on said pilot drill shaft, and (f) means for removably securing said cutting blades in the periphery of said body.

6. A hole cutter according to claim 5 in which the axial opening in the body is polygonal in cross-section and the pilot drill shaft is complementary thereto.

* * * * *